United States Patent [19]

Mukaiyama et al.

[11] 3,876,698

[45] Apr. 8, 1975

[54] PROCESS FOR THE PRODUCTION OF ORGANIC CARBOXYLIC ACID DERIVATIVES

[75] Inventors: Teruaki Mukaiyama; Masaaki Ueki, both of Tokyo; Hiroshi Maruyama, Yokohama; Rei Matsueda, Tokyo, all of Japan

[73] Assignee: Sankyo Company Limited, Tokyo, Japan

[22] Filed: Sept. 25, 1972

[21] Appl. No.: 292,164

Related U.S. Application Data

[63] Continuation of Ser. No. 809,985, March 24, 1969, abandoned.

[30] Foreign Application Priority Data

Mar. 25, 1968 Japan .............................. 43-19268

[52] U.S. Cl. .......... 260/558 R; 260/112.5; 260/469; 260/475 R; 260/476 R; 260/485 R; 260/486 R; 260/488 CD; 260/488 R; 260/558 R; 260/558 P; 260/561 R; 260/561 N; 260/562 R

[51] Int. Cl. ........................................ C07c 103/04

[58] Field of Search .................... 260/558, 561, 562

[56] References Cited

OTHER PUBLICATIONS

Mukaiyama et al., I, J. Am. Chem. Soc., Vol. 90, pp. 4490–91 (7/1968).

Mukaiyama et al., II, J. Am. Chem. Soc., Vol. 91, pp. 1554–1555 (3/1969).

*Primary Examiner*—Harry I. Moatz
*Attorney, Agent, or Firm*—Waters, Roditi, Schwartz & Nissen

[57] ABSTRACT

Organic carboxylic acid amides or esters are prepared by reacting the metal salt of the corresponding carboxylic acid with a sulfenic acid amide or ester in the presence of a tertiary phosphine.

9 Claims, No Drawings

PROCESS FOR THE PRODUCTION OF ORGANIC CARBOXYLIC ACID DERIVATIVES

CROSS-REFERENCE TO RELATED APPLICATIONS

This is a continuation of application Ser. No. 809,985, filed Mar. 24, 1969, and now abandoned.

This invention relates to an improved process for the production of an organic carboxylic acid amide or ester.

Various studies have been made heretofore for the production of carboxylic acid amides or esters. The processes which have been most widely accepted include that which comprises reacting the functional derivative of an organic carboxylic acid (e.g. acid halide, acid anhydride, etc.) with an organic amine or alcohol, and that which comprises condensing a carboxylic acid with an organic amine or alcohol in the presence of a strong dehydrating agent (e.g. carbodiimide, etc.). However, these prior art processes suffer from several disadvantages. For instance, where a carboxylic acid having a complicated structure is used as a starting material, undesired side reactions take place. In some cases, it is very difficult to prepare the functional derivative of a carboxylic acid because of its poor stability. When an optically active compound such as a naturally occurring amino acid or peptide is used as a starting material in the dehydrative condensation process, the resulting product tends to lose optical activity as a consequence of side reactions.

After our extensive studies on the production of an organic carboxylic acid amide or ester under mild conditions and without side reactions, it has now been found that the metal salt of carboxylic acid reacts with a sulfenic acid amide or ester in the presence of a tertiary phosphine to produce the desired carboxylic acid amide or ester in a good yield. This was reported in J. Am. Chem. Soc., 90, 4490-1 (July 31, 1968).

It is, therefore, an object of this invention to provide a novel and improved process for the production of an organic carboxylic acid amide or ester.

Other objects of this invention will be apparent from the following detailed description of this invention.

One of the starting materials used in the process of the present invention is the metal salt of a carboxylic acid which may be aliphatic, aromatic or heterocyclic. The kind and type of aliphatic, aromatic or heterocyclic carboxylic acids is not critical, and one may satisfactorily employ as a starting material any carboxylic acids, for example, saturated or unsaturated, straight or branched or long- or short-chain aliphatic carboxylic acids; aromatic monocyclic or polycyclic carboxylic acids which may carry any substituent in the aromatic ring; heterocyclic carboxylic acids with 5- or 6-membered or condensed heterocyclic ring and the like. The carboxylic acids may be monobasic or polybasic, in the latter case other carboxyl groups being protected except for the carboxyl group which will take part in the reaction. As to a metal component for forming a salt with the carboxylic acid there is no specific limitation. However, metals which can easily form mercaptides, especially including copper, silver, mercury, lead, ester which is the other starting material is an amide obtained from an alkyl- or aryl-sulfenic acid and an aliphatic, aromatic or heterocyclic amine, or an ester obtained from the above-mentioned sulfinic acid and an aliphatic or aromatic alcohol. If the starting compound used has a reactive functional group such as —COOH, —NH—, —SH or —OH as an optional substituent which is not desired to have take part in the reaction, it is desirable to block said functional group with a protecting group which may be easily removed after the intended reaction. For example, a carboxyl group can be protected in the form of an ester, e.g. lower alkyl or benzyl ester, an amino group can be protected by acylation, e.g. formylation, trifluoroacetylation, benzyloxycarbonylation, tert.-butoxycarbonylation, tert.-amyloxycarbonylation, etc. Imino, sulfohydryl and hydroxy groups can be protected by N-, S- and O-benzylation, respectively. Other protecting groups which are commonly known in the art of peptide chemistry are also usable. If such protecting groups are used, the present invention is applicable to the amide formation reaction in the peptide synthesis to prepare long- and short-chain polypeptides.

In accordance with the process of the present invention, the above-referred starting compounds are mixed with a tertiary phosphine in a suitable solvent. Typically preferred solvents include halogenated hydrocarbons, e.g. methylene chloride, chloroform and the like, acetonitrile and dimethylformamide. However, any other solvents which are non-reactive to the reactants are also usable.

The reaction temperature and period are not critical in this invention, but it is usual to conduct the reaction at room temperature for about 5 minutes to about 5 hours. Any tertiary phosphine selected from aromatic and aliphatic hydrocarbyl phosphines can be used without specific restriction. Preferred phosphine compounds include triphenyl phosphine and tributyl phosphine.

The process of the present invention can be illustrated by the following formulas:

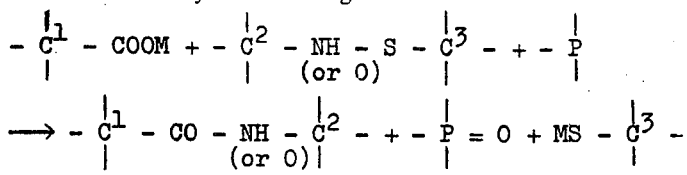

In the above formulas, the figure attached to the symbol of carbon atom is to show the manner of combination of one compound and another in the reactant and product systems. M means a metal atom which corresponds to a univalent metal. Thus, for example, if the metal is divalent copper, M should be taken for 1/2 Cu.

After completion of the reaction, the reaction mixture is worked up in the conventional manner to recover the desired compound therefrom. For example, undissolved materials are filtered off and the filtrate is washed with water and dried with a drying agent. The dried solution is distilled to remove the solvent. The residue is treated with ether or petroleum ether to have the desired compound crystallized out. Sometimes, the said residue is extracted with the solvent and then the extract is subjected to distillation under reduced pressure to obtain the desired compound. If necessary, purification by a conventional means, e.g. by column chromatography may be made.

Now the present invention will be explained in full

EXAMPLE 1: N-n-butyl acetamide 1.81 g. of benzenesulfenic acid n-butylamide is dissolved in 20 ml. of methylene chloride. The resulting solution is added with stirring with 1.59 g. of mercuric acetate at room temperature. Thereto, a solution of 2.62 g. of triphenyl phosphine in 20 ml. of methylene chloride is added dropwise over 5 minutes. Stirring is continued for an additional 3 hours. Separated mercaptide is removed by filtration. The filtrate is distilled to remove the solvent and the residue thus obtained is treated with petroleum ether and ether. Undissolved triphenyl phosphine oxide is removed by filtration. The solvent is distilled off from the filtrate and the residue thus obtained is subjected to distillation under reduced pressure. 1.09 g. of n-butyl acetamide boiling at 108°C./1 mmHg is obtained.

Example 2: Caproic acid n-butyl amide

1. The procedures of Example 1 are repeated but using 1.43 g. of cupric caproate and 1.61 g. of n-butylsulfenic acid n-butyl amide as the starting compound and reagent. By working up the reaction mixture, 1.20 g. of caproic acid n-butyl amide boiling at 95°–98°C./0.05 mmHg is obtained.

2. The procedures of Example 1 are repeated but using 1.44 g. of nickel caproate, 2.62 g. of triphenyl phosphine and 1.81 g. of benzenesulfonic acid n-butyl amide as the starting compound and reagents. By working up the reaction mixture, 1.45 g. of caproic acid n-butyl amide is obtained.

Example 3: Caproic acid diethyl amide

The procedures of Example 1 are repeated but using 2.19 g. of lead caproate, 1.71 g. of p-chlorobenzenesulfenic acid diethyl amide and 2.62 g. of tributyl phosphine. By working up the reaction mixture, 1.54 g. of caproic acid diethyl amide boiling at 95°–96°C./5 mmHg is obtained.

Example 4: Benzoic acid anilide

The procedures of Example 1 are repeated but using 2.21 g. of mercuric benzoate, 2.62 g. of triphenyl phosphine and 2.01 g. of benzenesulfenic acid anilide. By working up the reaction mixture, 1.63 g. of benzoic acid anilide boiling at 117°–119°C./10 mmHg (m.p. 163°C.) is obtained.

EXAMPLE 5: p-Toluic acid n-butyl amide

The procedures of Example 1 are repeated but using 1.67 g. of cupric toluate, 1.81 g. of benzenesulfenic acid n-butyl amide and 2.62 g. of triphenyl phosphine. The reaction mixture is worked up to make it free from mercaptide and phosphine oxide. By purification using silica gel-packed column chromatography, 1.53 g. of p-toluic acid n-butyl amide is obtained.

Example 6: Benzyloxycarbonyl-L-phenylalanyl glycine ethyl ester

The procedures of Example 1 are repeated but using 3.30 g. of benzyloxycarbonyl-L-phenylalanine cupric salt, 2.56 g. N-o-nitrophenylsulfenyl glycine ethyl ester and 5.24 g. of triphenyl phosphine. After completion of the reaction, the solvent is removed by distillation under reduced pressure. The residue is treated with 50 ml. of methanol. Undissolved materials are removed by filtration and the filtrate is concentrated to about 10 ml. This is treated with 10 ml. of ether and 40 ml. of petroleum ether and the mixture is allowed to stand. Benzyloxycarbonyl-L-phenylalanyl glycine ethyl ester is separated as white crystals. Yield 3.50 g., m.p. 109°–112°C. $[\alpha]_D^{20} = -17.5°$ (c=2, ethanol)

EXAMPLE 7: Benzyloxycarbonyl-tetraglycine ethyl ester

1. The procedures of Example 1 are repeated but using 2.97 g. of benzyloxycarbonyl-diglycine cupric salt, 3.13 g. of N-o-nitrophenylsulfenyl diglycine ethyl ester and 5.24 g. of triphenyl phosphine and using the reaction period of 5 hours. After completion of the reaction, the solvent is removed by distillation and the residue is immersed in ethyl acetate. The resulting solution is treated with ether, whereupon 2.86 g. of benzyloxycarbonyltetraglycine ethyl ester is separated as white crystals. It has a melting point of 204°C.

2. The above procedures are repeated with except that 3.54 g. of benzyloxycarbonyl-triglycine cupric salt, 2.56 g. of N-o-nitrophenyl-sulfenyl glycine ethyl ester and 5.24 g. of triphenyl phosphine are the starting compound and reagents. By working up the reaction mixture as described above, 2.76 g. of benzyloxycarbonyl-tetraglycine ethyl ester is obtained.

EXAMPLE 8: Benzoic acid tetiary butyl ester

A solution of 2.21 g. of mercuric benzoate and 2.62 g. of triphenyl phosphine in 20 ml. of methylene chloride is added with a solution of 2.18 g. of p-chlorobenzenesulfenic acid tert.-butyl ester in 10 ml. of methylene chloride. The resulting mixture is stirred at room temperature for 5 hours. After the reaction, the mixture is worked up in the same manner as in Example 1. 1.25 g. of benzoic acid tert.-butyl ester boiling at 75°C./3 mmHg is obtained.

Example 9: Caproic acid benzyl ester

The procedures of Example 1 are repeated but using 1.43 g. of cupric caproate, 2.62 g. of triphenyl phosphine and 2.50 g. of p-chlorobenzene-sulfenic acid benzyl ester as the starting compound and reagents and using the reaction period of 5 hours. By working up the reaction mixture, 1.65 g. of caproic acid benzyl ester boiling at 270°C. is obtained.

EXAMPLE 10: Benzyloxycarbonyl glycine benzyl ester

The procedures of Example 1 are repeated but using 2.40 g. of benzyloxycarbonyl glycine cupric salt, 2.62 g. of triphenyl phosphine and 2.16 g. of benzenesulfenic acid benzyl ester and using the reaction period of 5 hours. After the reaction, mercaptide and phosphoxide are removed from the reaction mixture. Column chromatography using silica gel gives 1.27 g. of benzyloxycarbonyl glycine benzyl ester boiling at 71°C.

EXAMPLE 11: Benzyloxycarbonyl glycine tert.-butyl ester

The procedures of Example 1 are repeated but using 2.40 g. of benzyloxycarbonyl glycine cupric salt, 2.62 g. of triphenyl phosphine and 1.82 g. of benzenesulfenic acid tert.-butyl ester and using the reaction period of 5 hours. After the reaction, mercaptide and phosphine oxide are removed from the reaction mixture. Column chromatography using silica gel gives 2.02 g. of benzyloxycarbonyl glycine tert.-butyl ester.

What we claim is:

1. A process for the preparation of an organic carboxylic amide which comprises reacting a metal salt of a carboxylic acid, selected from the group consisting of saturated or unsaturated, straight or branched or long or short-chain alephatic carboxylic acids, aromatic monocyclic or polycyclic carboxylic acids which may carry any substituent in the aromatic ring and heterocyclic carboxylic acids with a 5- or 6-membered or condensed heterocyclic ring, wherein the metal is selected from the group consisting of copper, silver, mercury, nickel and lead, with an N-(aliphatic) or N-(aromatic) alkyl or aryl sulfenic acid amide in an inert solvent in the presence of an amount of a phosphine selected from the group consisting of tributyl phosphine and triphenyl phosphine at least equimolar to the sulfenic acid amide, with the proviso that any starting material is devoid of other reactive functional groups.

2. A process according to claim 1 wherein the phosphine is tributyl phosphine.

3. A process according to claim 1 wherein the phosphine is triphenyl phosphine.

4. A process as in claim wherein the carboxylic acid is acetic acid and the sulfenic acid amide is benzenesulfenic acid n-butylamide.

5. A process as in claim 1 wherein the carboxylic acid is caproic acid and the sulfenic acid amide is n-butyl sulfenic acid n-butyl amide.

6. A process as in claim 1 wherein the carboxylic acid is caproic acid and the sulfenic acid amide is p-chlorobenzene-sulfenic acid diethyl amide.

7. A process as in claim 1 wherein the carboxylic acid is benzoic acid and the sulfenic acid amide is benzenesulfenic acid anilide.

8. A process as in claim 1 wherein the carboxylic acid is p-toluic acid and the sulfenic acid amide is benzenesulfenic acid n-butyl amide.

9. A process for the production of an organic carboxylic acid amide, which comprises reacting a metal salt of an organic carboxylic acid selected from the group consisting of acetic acid, caproic acid, benzoic acid, and p-toluic acid, wherein the metal is selected from the group consisting of copper, silver, mercury, nickel and lead, with a sulfenic acid n-butylamide, n-butylsulfenic acid n-butylamide, p-chlorobenzene sulfenic acid diethylamide and benzenesulfenic acid anilide, in an inert solvent in the presence of an amount of a phosphine selected from the group consisting of tributyl phosphine and triphenyl phosphine at least equimolar to the amount of sulfenic acid amide.

* * * * *